United States Patent [19]

Valantin

[11] 4,232,911
[45] Nov. 11, 1980

[54] CARRIAGE WITH ARTICULATED TRACK

[75] Inventor: Alfred A. M. Valantin, Clermont, France

[73] Assignee: Charbonnages de France, Paris, France

[21] Appl. No.: 42,136

[22] Filed: May 24, 1979

Related U.S. Application Data

[63] Continuation of Ser. No. 858,065, Dec. 6, 1977, abandoned.

[30] Foreign Application Priority Data

Dec. 7, 1976 [FR] France .................. 76 36768

[51] Int. Cl.³ .................. B22D 55/10; B22D 55/20
[52] U.S. Cl. .................. 305/16; 305/44; 305/56
[58] Field of Search .................. 305/17, 18, 56, 35 EB, 305/16, 44, 45; 405/298

[56] References Cited

U.S. PATENT DOCUMENTS

| 1,316,092 | 9/1919 | Grover et al. | 305/44 |
| 1,479,408 | 1/1924 | Davis | 305/44 |
| 1,825,075 | 7/1931 | Knox et al. | 305/44 X |
| 2,484,754 | 10/1949 | Silva | 305/16 X |
| 4,129,990 | 12/1978 | Valantin | 305/16 X |

FOREIGN PATENT DOCUMENTS 1139084  11/1962  Fed. Rep. of Germany .......... 405/298

Primary Examiner—David A. Scherbel
Attorney, Agent, or Firm—Cushman, Darby & Cushman

[57] ABSTRACT

A machine carriage, for example for a mine roof support, has a beam with rounded ends around which an articulated track runs in a guide path which defines lateral clearance at each side of the track on the straight part of the path. The track is guided without play around the rounded ends of the beam.

7 Claims, 6 Drawing Figures

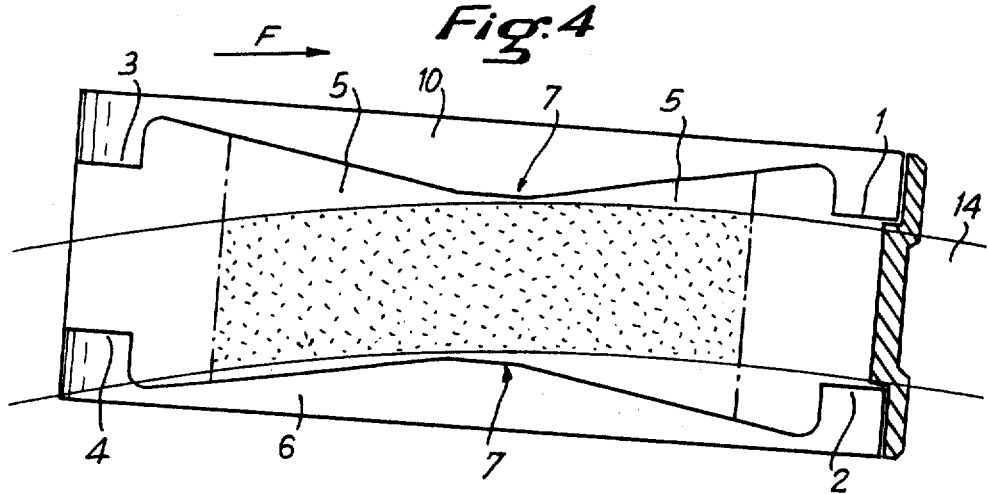
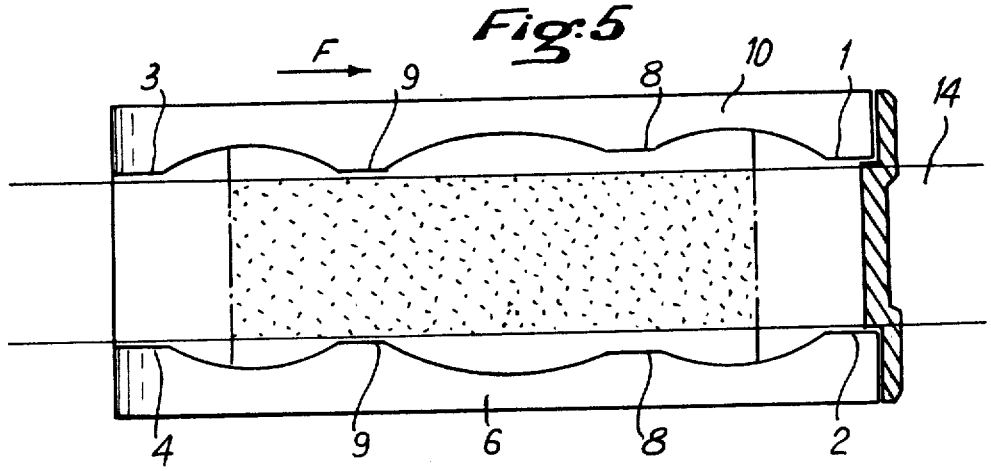
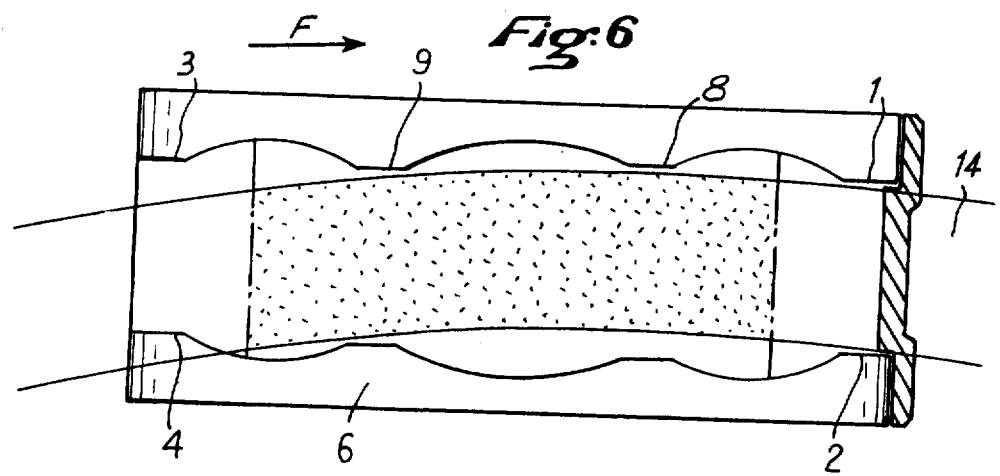

CARRIAGE WITH ARTICULATED TRACK

This is a continuation of application Ser. No. 858,065, filed Dec. 6, 1977, now abandoned.

BACKGROUND OF THE INVENTION

This invention relates to a carriage for a machine, such as a roof support, which comprises a beam having rounded ends and encircled by an articulated track which is guided by friction in a guide path formed on the straight portion and the return ends of the beam, the track being guided without play around the rounded return ends of the beam.

Various mine working machines are known which use carriages of this type, for example a level cutting machine as described in French Pat. No. 1,118,233 or a roof support as described in German Pat. Application No. 1,139,084.

When machines of this kind have carriages of the type described above, arranged in parallel pairs, for example two upper carriages or two lower carriages of a roof support, there is a problem of how to permit slight turns to the right or left without applying excessive forces to the roof or floor, and of preventing the machine from becoming jammed in any direction.

SUMMARY

According to the invention, this problem is overcome by providing a guide path such that the articulated track has lateral clearance on the straight part of the beam.

In a preferred embodiment this lateral play is provided on either side of at least one and at most two narrowed regions where there is localised reduction of lateral play of the track in the guide path.

The invention may be employed in a roof support which is capable of movement by its own drive mechanism. Whilst under permanent load, which support comprises at least two parallel pairs of endless articulated tread carriages, one of each pair constituting a lower carriage and the other an upper carriage which are to be applied respectively against the floor and against the roof of a mine gallery by loading means operable by extension under pressure to force apart at least three connecting cross-members, of which two are between two parallel lower carriages and at least one between two parallel upper carriages of the two parallel pairs of carriages, in which roof support the drive mechanism acts exclusively by action and reaction movement of two members of the support with respect to each other, on one another, as described in United Kingdom Pat. No. 766,811.

BRIEF DESCRIPTION OF THE DRAWINGS

Some embodiments of the invention will now be described, by way of example, with reference to the accompanying drawings in which.

Figure 1:
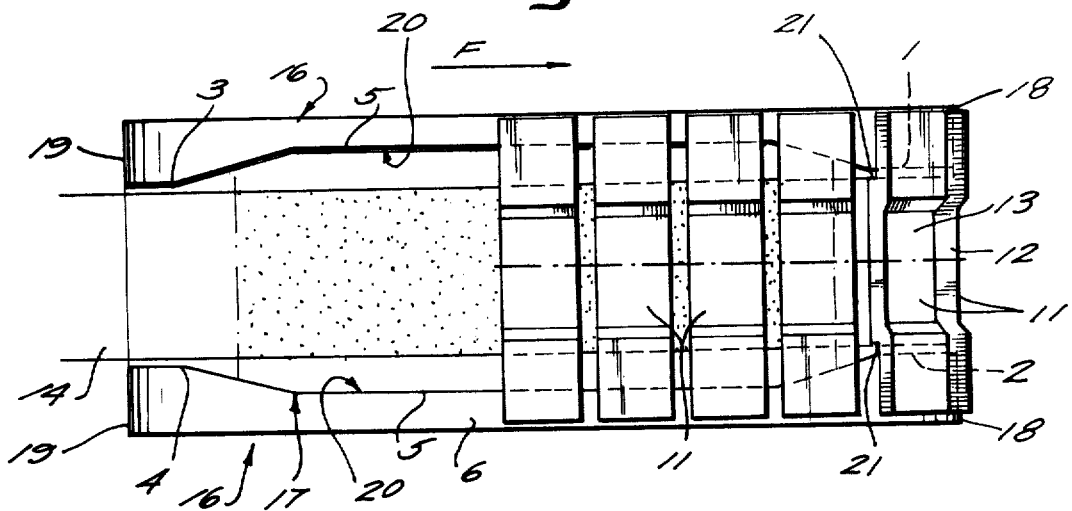
FIG. 1 is a schematic bottom plan view of one lower carriage of a roof support device provided with an endless articulated track, shown traveling along a straight path showing the connection between the track shoes schematically as a dash-dot-line.
Figure 2:
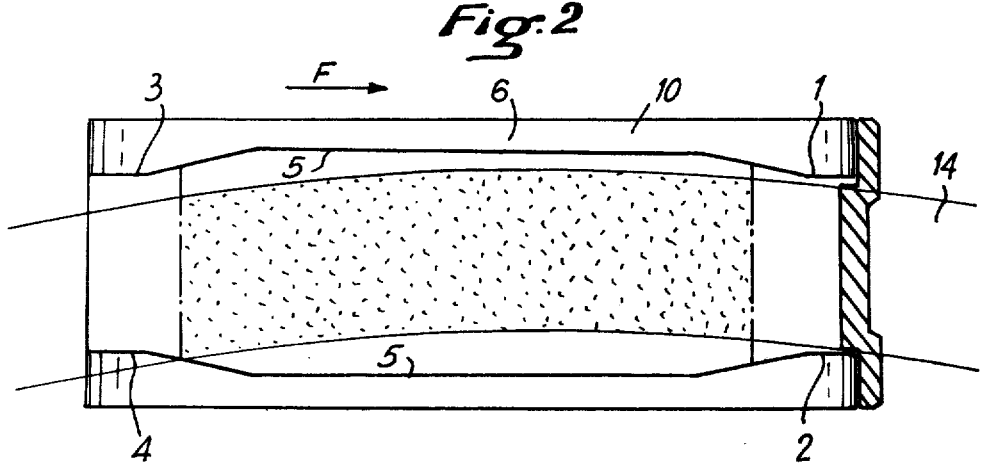
FIG. 2 is a similar view of the same device, but shown when traveling along a curved path.

(For the instance of traveling mine roof supports having both upper and lower carriages, FIGS. 1 and 2 may also be understood to be respective top plan views of one upper carriage.)

Figure 3:
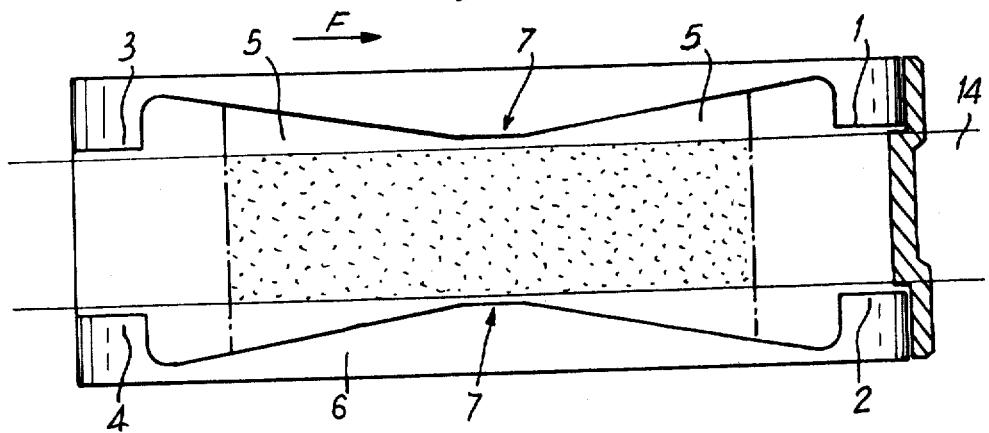

FIGS. 3 and 4 show similar views of another embodiment of the invention; and

FIGS. 5 and 6 show similar views of yet another embodiment of the invention.

DESCRIPTION OF THE PREFERRED EMBODIMENTS

FIGS. 1 and 2 show a beam 16 for a carriage of a roof support. The beam 16 has a leading rounded end 18 and a trailing rounded end 19. Extending between the ends 18 and 19 is a straight portion 6. An articulated endless track 11 of track shoes or tread plates 12 is perimetrically entrained about the beam 16. Along the bottom face of the beam 16, if this beam is on a lower carriage to be moved across a floor, or across the top face of the beam 16, if this beam is on an upper carriage to be moved across the underside of a roof the track shoes or tread plates 12 have their guide heels 13 received in a guide slot 17 which extends along that face of the beam 16, from the front rounded end 18 of the beam to the rear rounded end 19 forming a guide path for the track as the track circulates around the beam. The laterally inwardly facing opposite edges 20 of the guide slot 17 provide respective cam surfaces and the laterally outwardly facing opposite edges 21 of each tread plate heel 13 provide respective cam-following surfaces. As is apparent from the Figures, the width of the gap laterally between the cam surfaces 20 is not constant from one end to the other. Rather, on the rounded ends 18, 19, the gap is narrower, and in the straight portion 6 between the ends the gap is broadened. In the embodiment of FIGS. 1 and 2, the broadening of the gap is defined by two concave recesses in the cam surfaces 20, which face one another across the gap.

Thus there are two narrower end portions of the gap, between the unrecessed regions or bosses 1 and 2 at the leading rounded end 18 and between the unrecessed regions or bosses 3 and 4 at the trailing rounded end 19. In these two narrow gap regions, the lateral distance between the cam surfaces is too small to permit substantial lateral play of the articulated track shoes which have the guide heels 13 thereof in the guide slot 17 in said two narrow gap regions ½ and ¾.

However, in the straight portion 6 of the beam 16, where the slot 17 is wider due to the presence of recessed portions 5, the track shoes which have the guide heels thereof in the guide slot 17 laterally between the recessed portions 5 are given room for lateral play.

In the Figures, the region 14 indicated between two parallel lines suggests the path of the track as the carriage having the beam 16 is moved across the roof or floor.

As will be explained this special arrangement enables the roof support to travel around a curve.

If during movement of the roof support the movement of one lower carriage and of the upper carriage disposed above it are intentionally interrupted, continuing movement of the other lower carriage and of the other upper carriage tends to cause them to pivot substantially around their centres so that the laterally inner edges 16 of the guide bosses 1 and 2, FIG. 1, push laterally the heel 13 of the shoes 12, which bosses are situated at the forward end of the beam considered in the direction of advance F of the support, so that the track is guided without play. Each new shoe of the track is therefore offset laterally relative to the preceding shoe as it is laid down, and the succession of shoes thus laid down form a curve whose direction is that given by the pivoting of the beam, which is slidingly guided on the shoes which are laid down in front of it. The beam follows the path of these shoes, so that the recesses 5 permit the path of the track to assume the curved shape 14 shown in FIG. 2.

The embodiment described above is very suitable for the movement of the roof support and enables the support to travel around a bend in cases where the roof and the floor are regular and substantially horizontal.

In other applications, whether the path is curved or straight, the forces applied to the track shoes in contact with the ground may offset them laterally, and this offsetting may be so great that the side faces of the shoes rub against the surface of the recess facing the concave edge of the track, which would be detrimental to satisfactory advance of the support and may cause premature wear both of the recess and of the side faces of the shoes.

If this occurs while the support is following a straight path, it may subsequently be impossible for the support to move around a curve.

FIGS. 3 to 6 show preferred modified embodiments enabling these disdvantages to be avoided.

In FIGS. 3 and 4 the recess existing between the bosses 1 and 2 at one end and the bosses 3 and 4 at the other end of the beam is formed with two bosses 7 defining a narrowed region of a width substantially equal to the width of the gap between the bosses 1 and 2 and the width of the gap between the bosses 3 and 4.

In FIGS. 5 and 6 the recess is defined between two pairs of bosses 8 and 9, the width of the rearward gap between the bosses 8 which are situated nearer the bosses 3 and 4, is substantially equal to the distance separating the bosses 3 and 4, while the width of the gap between the forward bosses 8 is greater.

As well as reducing surface contact between the sides of the recess and the shoes, and therefore reducing their time of contact and their wear, these narrowed regions make it possible to avoid lateral offsetting of the beams in relation to the desired path, whether straight or curved.

I claim:

1. A carriage for a machine, such as a roof support, comprising:
    a beam having rounded ends; and
    an articulated track encircling the beam,
    said articulated track being guided by friction in a guide path formed around the beam, which guide path has lateral clearance on the straight part of the beam and guides the track without play around the rounded ends of the beam;
    the guide path on the straight part of the beam being formed with said lateral clearance on either side of at least one and at most two narrowed regions where there is localised reduction of lateral play of the track in the guide path.

2. A carriage according to claim 1, wherein the guide path is formed with two narrowed regions of unequal widths.

3. A carriage according to claim 2, wherein the rearward narrowed region is narrower than the forward narrowed regions, considered in the direction of advance of the carriage.

4. A carriage for a machine such as a roof support, comprising:
    a beam having two opposite rounded ends and a straight portion extending between the two rounded ends, so that two rounded ends and the straight portion are arranged to provide a guide means for an endless track;
    a non-driven endless track of succeeding plates perimetrically entrained about said beam;
    individuals of said plates being pivotally secured to one another in succession, so that the adjacent track plates may articulate around said rounded ends as said track advances perimetrically of the beam an so that the adjacent track plates may move laterally relative to one another when disposed upon at least part of said straight portion;
    means defining a pair of laterally-opposed cam-following surfaces on each track plate;
    means defining a pair of laterally-opposed cam surfaces on said beam, each of which extends from upon one said rounded end, along said straight portion, to upon the other said rounded end;
    said pair of laterally opposed cam surfaces, at least upon said rounded ends, being spaced to so substantially preclude lateral play of said track by engagement with said cam-following surfaces of the respective ones of said track plates that where said track is entrained about said rounded ends, said track is free to advance perimetrically but not free to move laterally;
    said pair of laterally opposed cam surfaces, at least throughout said part of said flat portion being so spaced as to laterally less-strictly and thus more loosely confine said track by representing opposite limits to the possible lateral deflection of the respective cam-following surfaces of the respective track plates where said track is disposed upon said part of said straight portion.

5. The carriage of claim 4, wherein:
    each of said cam surfaces on said beam is stationarily fixed relative to said beam.

6. The carriage of claim 5, wherein:
    said cam-following surfaces face laterally away from one another and said cam surfaces face laterally towards one another.

7. The carriage of claim 4, wherein:
    said part of said straight portion of said beam extends substantially all of the way between said two opposite rounded ends of said beam.

* * * * *